US012464212B2

(12) United States Patent
Wang et al.

(10) Patent No.: US 12,464,212 B2
(45) Date of Patent: Nov. 4, 2025

(54) ELECTRONIC DEVICE FOR REDUCING HEIGHT DIMENSION OF CAMERA MODULE DECORATIVE PART

(71) Applicant: VIVO MOBILE COMMUNICATION CO., LTD., Guangdong (CN)

(72) Inventors: Wei Wang, Dongguan (CN); Dongcun Cheng, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 123 days.

(21) Appl. No.: 18/382,076

(22) Filed: Oct. 20, 2023

(65) Prior Publication Data

US 2024/0048834 A1 Feb. 8, 2024

Related U.S. Application Data

(63) Continuation of application No. PCT/CN2022/087008, filed on Apr. 15, 2022.

(30) Foreign Application Priority Data

Apr. 21, 2021 (CN) .......................... 202110434102.4

(51) Int. Cl.
 *H04N 5/335* (2011.01)
 *H04M 1/02* (2006.01)
 *H04N 23/55* (2023.01)
 *H04N 23/57* (2023.01)

(52) U.S. Cl.
 CPC .......... *H04N 23/55* (2023.01); *H04M 1/0264* (2013.01); *H04N 23/57* (2023.01); *H04M 2250/52* (2013.01)

(58) Field of Classification Search
 CPC ................................................... H04N 23/695
 See application file for complete search history.

(56) References Cited

U.S. PATENT DOCUMENTS

| 11,258,951 | B2 * | 2/2022 | Platner | ................ | H04N 23/687 |
| 11,409,124 | B2 | 8/2022 | Sue et al. | | |
| 2002/0065102 | A1 | 5/2002 | Miyake et al. | | |
| 2014/0368914 | A1 * | 12/2014 | Hu | ........................... | G02B 7/08 |
| | | | | | 359/557 |

(Continued)

FOREIGN PATENT DOCUMENTS

| CN | 106659028 A | | 5/2017 |
| CN | 206195952 U | * | 5/2017 |

(Continued)

*Primary Examiner* — Gary C Vieaux
(74) *Attorney, Agent, or Firm* — The Webb Law Firm

(57) ABSTRACT

An electronic device includes a device body, a camera module decorative part, and a pan-tilt camera apparatus. The device body has an inner cavity and an opening communicating with the inner cavity. The camera module decorative part is disposed in the opening, and the camera module decorative part has a through hole. The pan-tilt camera apparatus is disposed in the inner cavity, and the pan-tilt camera apparatus faces toward the through hole. The pan-tilt camera apparatus includes a base and a camera module, the camera module is movably disposed on the base, and a surface of the camera module facing away from the inner cavity and a surface of the camera module decorative part facing away from the opening are located on a same plane.

9 Claims, 8 Drawing Sheets

(56) References Cited

U.S. PATENT DOCUMENTS

| | | |
|---|---|---|
| 2019/0068767 A1 | 2/2019 | Liu et al. |
| 2020/0412927 A1 | 12/2020 | Platner et al. |
| 2023/0336853 A1 | 10/2023 | Li et al. |
| 2023/0336855 A1 | 10/2023 | Li et al. |

FOREIGN PATENT DOCUMENTS

| | | | | |
|---|---|---|---|---|
| CN | 206259980 U | | 6/2017 | |
| CN | 107340667 A | | 11/2017 | |
| CN | 206977561 U | | 2/2018 | |
| CN | 110740243 A | | 1/2020 | |
| CN | 212324132 U | | 1/2021 | |
| CN | 212324225 U | | 1/2021 | |
| CN | 112492148 A | | 3/2021 | |
| CN | 112637469 A | | 4/2021 | |
| CN | 112637470 A | * | 4/2021 | ........... G03B 17/561 |
| CN | 213028144 U | | 4/2021 | |
| CN | 213028238 U | | 4/2021 | |
| JP | 202128659 A | | 2/2021 | |
| WO | 2021023040 A1 | | 2/2021 | |

\* cited by examiner

ELECTRONIC DEVICE FOR REDUCING HEIGHT DIMENSION OF CAMERA MODULE DECORATIVE PART

CROSS-REFERENCE TO RELATED APPLICATIONS

This application is a Bypass Continuation Application of International Patent Application No. PCT/CN2022/087008, filed Apr. 15, 2022, and claims priority to Chinese Patent Application No. 202110434102.4, filed Apr. 21, 2021, the disclosures of which are hereby incorporated by reference in their entireties.

BACKGROUND OF THE INVENTION

Field of the Invention

This application relates to the field of terminal device technologies, and to an electronic device.

Description of Related Art

At present, a camera module of an electronic device such as a smartphone is disposed in an inner cavity of the electronic device, and a camera lens can be exposed through a camera module decorative part (which is also referred to as a camera bump) for easy shooting.

Because a change of a relative position of the camera lens in the camera module requires support by a complex structure and sufficient movement space, when the electronic device is designed, it also needs to design a camera module decorative part with a large volume and size. As a result, a height dimension of the camera module decorative part is large, affecting expressiveness of an appearance of a product.

SUMMARY OF THE INVENTION

This application provides an electronic device.

An embodiment of this application provides an electronic device, including:
  a device body, where the device body has an inner cavity and an opening communicating with the inner cavity;
  a camera module decorative part, where the camera module decorative part is disposed in the opening, and the camera module decorative part has a through hole; and
  a pan-tilt camera apparatus, where the pan-tilt camera apparatus is disposed in the inner cavity, the pan-tilt camera apparatus faces toward the through hole, the pan-tilt camera apparatus includes a base and a camera module, the camera module is movably disposed on the base, and a surface of the camera module facing away from the inner cavity and a surface of the camera module decorative part facing away from the opening are located on a same plane.

BRIEF DESCRIPTION OF THE DRAWINGS

The foregoing and/or additional aspects and advantages of this application will become apparent and readily understandable from the descriptions of the embodiments with reference to the following accompanying drawings.

Figure 1:
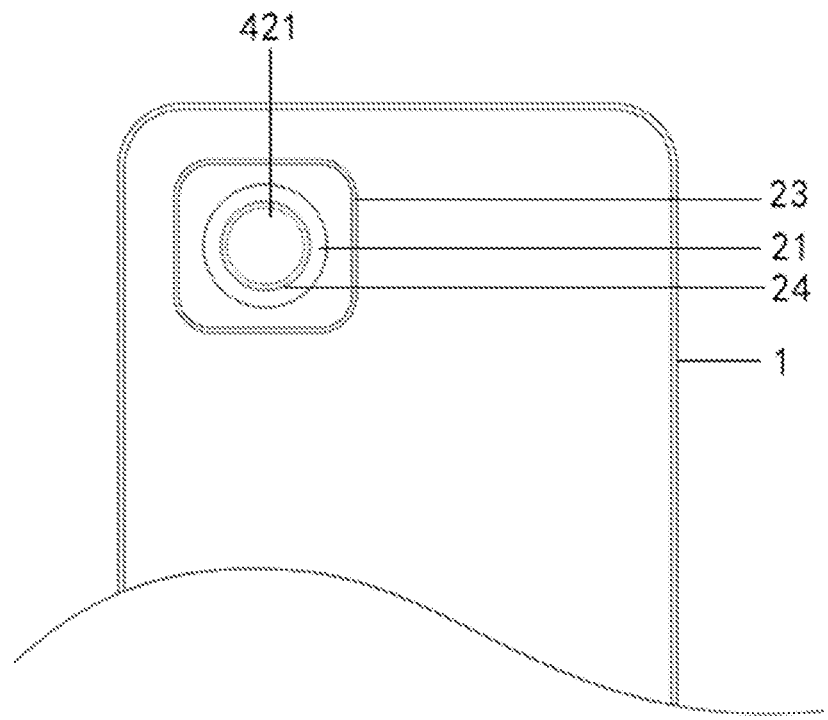
FIG. 1 is a three-dimensional diagram of a partial structure of an electronic device according to an embodiment of this application.
Figure 2:
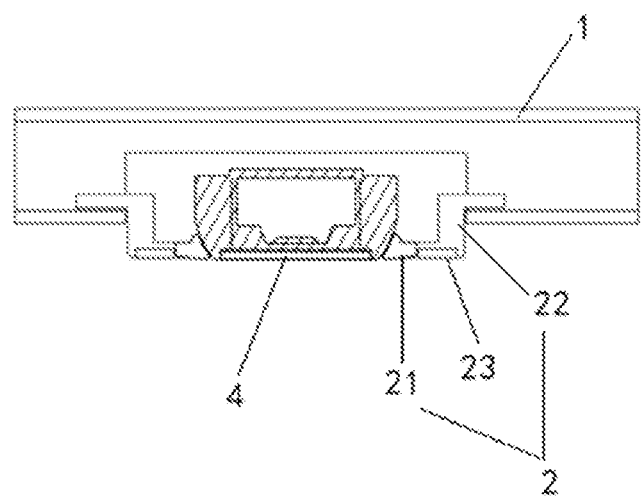
FIG. 2 is a first cross-sectional view of a partial structure of an electronic device according to an embodiment of this application.
Figure 3:
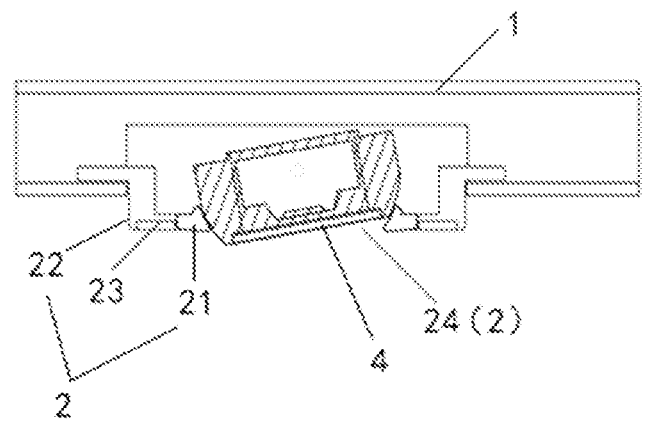
FIG. 3 is a second cross-sectional view of a partial structure of an electronic device according to an embodiment of this application.

Reference signs are described as follows:
  1—device body, 2—camera module decorative part, 3—base, 4—camera module, 5—drive assembly;
  21—camera module decorative ring, 22—camera lens decorative ring, 23—cover plate, 24—through hole;
  41—camera module housing, 42—camera lens assembly, 421—camera lens; and
  51—first telescopic member, 52—second telescopic member, 53—third telescopic member, 54—fourth telescopic member, 55—fifth telescopic member, and 56—sixth telescopic member.

DESCRIPTION OF THE INVENTION

The following describes embodiments of this application. Examples of the embodiments are illustrated in the accompanying drawings. Reference signs which are the same or similar throughout the accompanying drawings represent the same or similar elements or elements having the same or similar functions. The embodiments described below with reference to the accompanying drawings are exemplary and only used to explain this application, and cannot be understood as a limitation on this application. All other embodiments obtained by a person of ordinary skill in the art based on the embodiments of this application shall fall within the protection scope of this application.

Features of terms "first" and "second" in the specification and claims of this application may explicitly or implicitly include one or more such features. In the descriptions of this application, unless otherwise specified, "a plurality of" means two or more. In addition, in the specification and claims, "and/or" indicates at least one of connected objects, and the character "/" generally indicates an "or" relationship between associated objects.

In the descriptions of this application, it should be understood that an orientation or positional relationship indicated by the term "center", "longitudinal", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", or the like is based on an orientation or a positional relationship shown in the accompanying drawings, and is merely for ease of describing this application and simplifying the descriptions rather than indicating or implying that an apparatus or an element referred to must have a specific orientation or be constructed and operated in a specific orientation, and therefore cannot be understood as a limitation on this application.

In the descriptions of this application, it should be noted that unless otherwise specified and defined explicitly, the terms "mount", "connect", and "join" should be understood in their general senses. For example, they may refer to a fixed connection, a detachable connection, or an integral connection, may refer to a mechanical connection or an electrical connection, and may refer to a direct connection, an indirect connection via an intermediate medium, or an internal communication between two elements. A person of ordinary skill in the art can understand specific meanings of these terms in this application as appropriate to situations.

The following describes an electronic device provided in the embodiments of this application with reference to FIG. 1 to FIG. 13.

The electronic device may be, for example, a mobile terminal such as a smartphone, a tablet computer, a notebook computer, and a smart wearable device. The electronic device may also be a digital camera or another portable mobile photo-taking product, a camera product with phototaking and video-recording functions, or the like, which is not limited in this application.

Refer to FIG. 1 to FIG. 4. An embodiment of this application provides an electronic device. The electronic device includes a device body 1, a camera module decorative part 2, and a pan-tilt camera apparatus. The device body 1 has an inner cavity and an opening communicating with the inner cavity. The camera module decorative part 2 is disposed in the opening, and the camera module decorative part 2 has a through hole 24. The pan-tilt camera apparatus is disposed in the inner cavity, the pan-tilt camera apparatus faces toward the through hole 24, the pan-tilt camera apparatus includes a base 3 and a camera module 4, the camera module 4 is movably disposed on the base 3, and a surface of the camera module 4 facing away from the inner cavity and a surface of the camera module decorative part 2 facing away from the opening are located on a same plane.

In this embodiment of this application, an exposed pan-tilt camera apparatus is provided for the electronic device. The through hole is disposed on the camera module decorative part 2, so that the camera module 4 may be in an exposed state. The surface of the camera module 4 facing away from the inner cavity of the device body 1 and the surface of the camera module decorative part 2 facing away from the opening are located on the same plane, so that the camera module decorative part 2 can be around the camera module 4 for protecting the camera module 4. The design in this application helps to reduce a height dimension of the camera module decorative part 2, thereby improving an appearance quality of the electronic device.

In an optional example of this application, refer to FIG. 1 to FIG. 4. The camera module decorative part 2 includes a camera module decorative ring 22, a camera lens decorative ring 21 and a cover plate 23 that are disposed on the camera module decorative ring 22. The camera module decorative ring 22 protrudes into the inner cavity through the opening and is connected to the inner cavity. The cover plate 23 is arranged around an outer edge of the camera lens decorative ring 21, and the through hole 24 is disposed on the camera lens decorative ring 21.

In other words, the camera lens decorative ring 21 and the cover plate 23 both are disposed on the camera module decorative ring 22 to form the camera module decorative part 2.

The camera module decorative part 2 is connected to the device body 1 through the camera module decorative ring 22, so that the camera module decorative part 2 is fixedly disposed on the device body 1. The camera module decorative part 2 may be configured to protect the camera module 4.

The camera lens decorative ring 21 is, for example, of an annular structure, on which the through hole 24 is formed. The through hole 24 may be configured to expose part of the camera module 4, that is, the camera module 4 is in the exposed state, which helps to reduce the height dimension of the camera module decorative part 2. In this embodiment of this application, the camera module decorative part 2 is actually arranged around the camera module 4 for protecting the camera module 4. This design is different from a traditional design of which the entire camera module is closed under the camera lens decorative ring 21.

For example, the camera lens decorative ring 21 may be of an annular structure. Certainly, the camera lens decorative ring 21 may alternatively be of a racetrack-shaped annular structure. A person skilled in the art can flexibly adjust as appropriate to situations. This is not limited in this application.

In an optional example of this application, the camera lens decorative ring 21 and the cover plate 23 both are disposed on the camera module decorative ring 22, and the camera lens decorative ring 21 and the cover plate 23 are an integrally formed structure, such that the entire camera module decorative part has a good appearance and good firmness.

Optionally, the camera lens decorative ring 21 and the cover plate 23 may form an integrated structure by using, for example, an injection molding process. The camera lens decorative ring 21 and the cover plate 23 may be fixedly disposed on the top of the camera module decorative ring 21 by gluing.

The camera lens decorative ring 21 and the cover plate 23 are connected together by injection molding, such a design does not leave a gap between the camera lens decorative ring 21 and the cover plate 23 due to assembly, thereby resolving a problem of glue overflow occurring between the camera lens decorative ring 21 and the cover plate 23, and improving appearance aesthetics of the electronic device.

A material of the camera lens decorative ring 21 may be, for example, a plastic material. A hardness of the plastic material is lower than that of a metal material, but the plastic material can provide well buffering for protecting the camera module 4.

A material of the cover plate 23 may be, for example, a light-transmitting material.

Optionally, the cover plate 23 is, for example, a glass cover plate that does not affect light of the camera module 4.

Figure 4:
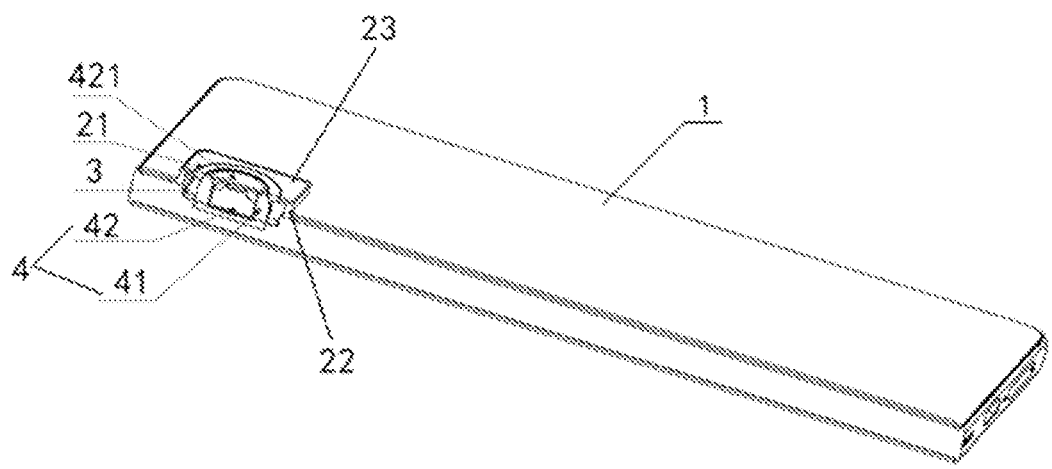
FIG. 4 is a schematic structural diagram of an electronic device according to an embodiment of this application.
Figure 5:
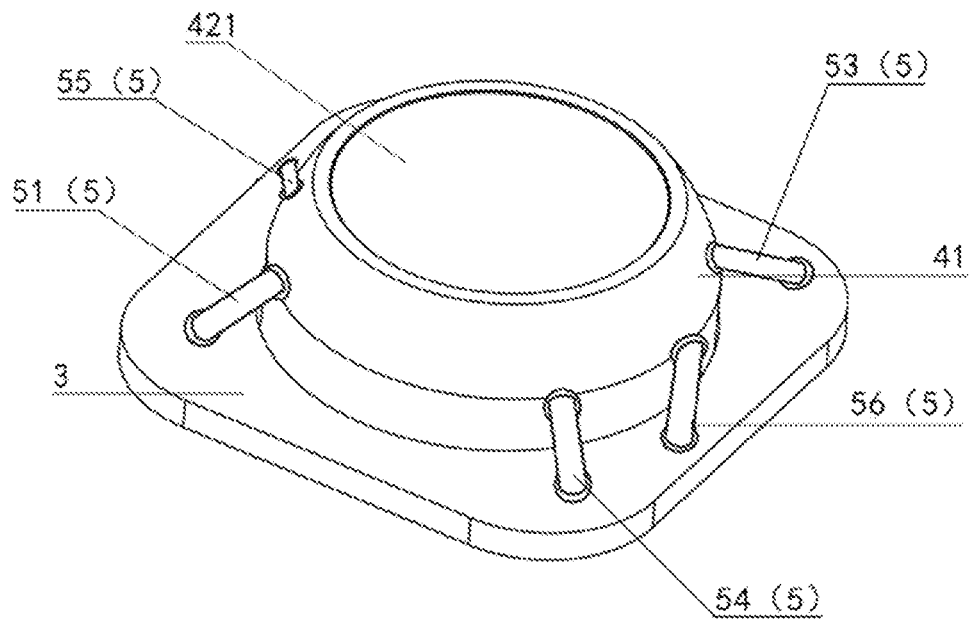
FIG. 5 is a first three-dimensional diagram of a pan-tilt camera apparatus of an electronic device according to an embodiment of this application.

In an optional example of this application, refer to FIG. 4 and FIG. 5. The camera module 4 includes a camera module housing 41 and a camera lens assembly 42 disposed in the camera module housing 41, and the camera lens assembly 42 includes a camera lens 421. The camera lens 421 is disposed in the through hole 24, and a surface of the camera lens 421 and a surface of the camera lens decorative ring 21 are located on a same plane.

In other words, the camera lens 421 of the camera module 4 is exposed outside from the through hole 24 of the camera lens decorative ring 21 instead of being closed. In this way, space can be left for a movement of the camera lens 421, that is, the movement of the camera lens 421 is not affected.

The camera module housing 41 is configured to accommodate the camera lens assembly 42, so that a structure of the entire camera module 4 is more integrated, helping assemble the camera module 4 in the device body.

In an optional example of this application, refer to FIG. 5 to FIG. 13. A section of the camera module housing 41 in a radial direction is circular.

In the embodiments of this application, the pan-tilt camera apparatus is configured to enable the electronic device to have functions such as shooting an image and a video, which can make the electronic device more functional. To make the camera module 4 have a good anti-shake performance when shooting a video or a picture, the camera module 4 is further equipped with a drive assembly 5 in this application.

In an optional example of this application, refer to FIG. 5 to FIG. 13. The pan-tilt camera apparatus further includes the drive assembly 5, and the camera module 4 is in transmission connection with the base 3 through the drive assembly 5. In a case that the drive assembly 5 is powered on, the drive assembly 5 is able to deform and drive the camera module 4 to move relative to the base 3.

In the embodiments of this application, the camera module 4, being directly driven by the drive assembly 5, can implement a multi-angle movement and/or rotation on a plane. In this way, when the electronic device is used to take a photo or shoot a video, once shaking occurs, the camera module 4 of the pan-tilt camera apparatus can automatically adjust a shooting angle in a timely manner, thereby achieving an effect of multi-angle anti-shake. That is to say, the driving of the drive assembly 5 may enable the camera module 4 to maintain a same movement trend as the device body 1, to achieve a good effect of anti-shake and avoid image distortion of an image or a video that is shot, thereby implementing high restoration of a real shooting state.

In addition, in the embodiments of this application, there is no need to set a special motor and transmission component for the pan-tilt camera apparatus. The camera module 4 is directly driven by deformation of the drive assembly 5 to perform a movement relative to the base 3. The deformation of the drive assembly 5 may be completed in a power-on state, and a manner of driving is very simple.

In an optional example of this application, refer to FIG. 6 to FIG. 13. The drive assembly 5 includes a first telescopic member 51, a second telescopic member 52, a third telescopic member 53, and a fourth telescopic member 54. The first telescopic member 51, the second telescopic member 52, the third telescopic member 53, and the fourth telescopic member 54 are uniformly distributed around the camera module 4, and the four telescopic members are disposed opposite each other. Two adjacent telescopic members of the first telescopic member 51, the second telescopic member 52, the third telescopic member 53, and the fourth telescopic member 54 are able to bend and deform in a case of being powered on, for driving the camera module 4 to perform translation on a plane on which the base 3 is located.

The first telescopic member 51, the second telescopic member 52, the third telescopic member 53, and the fourth telescopic member 54 are made of electro-deformable materials.

In an optional example of this application, the first telescopic member 51, the second telescopic member 52, the third telescopic member 53, and the fourth telescopic member 54 are made of ionic polymer metal composite materials. The ionic polymer metal composite material may include a polymer film substrate and metal particles deposited on a surface of the polymer film substrate.

Optionally, the ionic polymer metal composite material is a new type of electro-deformable polymer material. The polymer material uses a polymer film as a substrate, and metal particles are infiltrated and deposited on a surface of the substrate by electroless plating. The metal particles may be conventional metals such as iron and copper, and more preferably noble metal particles. The noble metal particles may increase a deformation rate of the ionic polymer metal composite material. When two sides of the ionic polymer metal composite material are respectively connected to positive and negative electrodes of a power supply, anode molecules in the ionic polymer metal composite material move to the side of the ionic polymer metal composite material that is connected to the negative electrode, and polar molecules are driven to move together to the side of the ionic polymer metal composite material that is connected to the negative electrode. As a result, the side of the ionic polymer metal composite material that is connected to the negative electrode gradually expands and becomes longer, and the ionic polymer metal composite material bends to the side of the ionic polymer metal composite material that is connected to the positive electrode. A direction and size of the power supply correspond to a deflection direction and bending degree of the ionic polymer metal composite material. In addition, the ionic polymer metal composite material may also contract and extend in a case of being applied with a voltage. Based on this deformation feature, the ionic polymer metal composite material may be used as a good drive assembly, and has characteristics of light weight, no noise, good flexibility, and the like.

Figure 6:
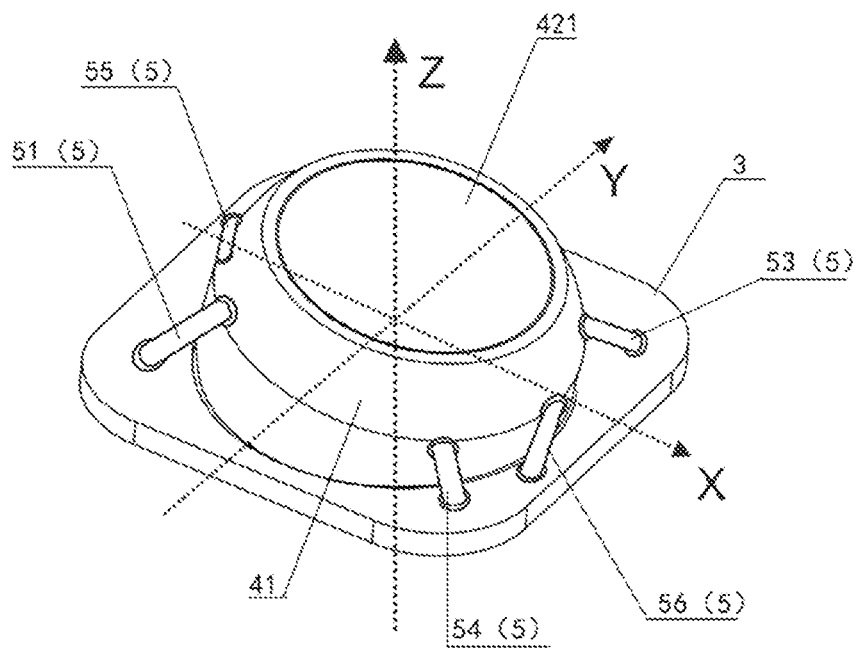
FIG. 6 is a second three-dimensional diagram of a pan-tilt camera apparatus of an electronic device according to an embodiment of this application.
Figure 7:
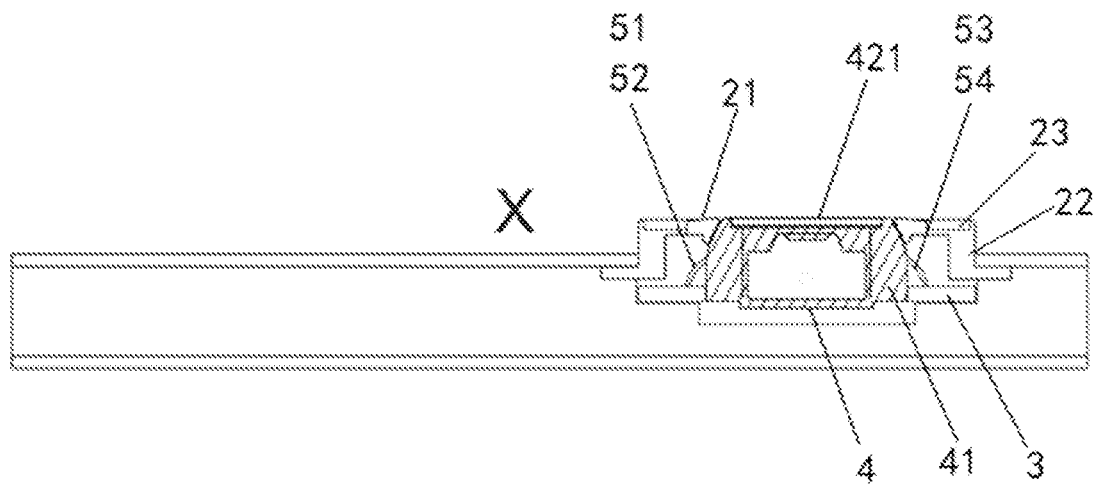
FIG. 7 is a third cross-sectional view of a partial structure of an electronic device according to an embodiment of this application.
Figure 8:
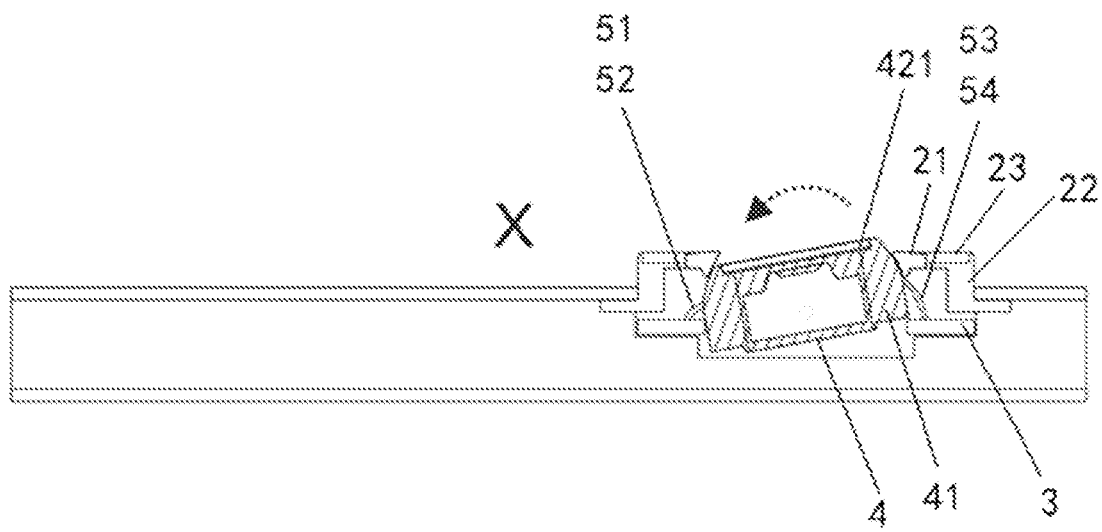
FIG. 8 is a fourth cross-sectional view of a partial structure of an electronic device according to an embodiment of this application.
Figure 9:
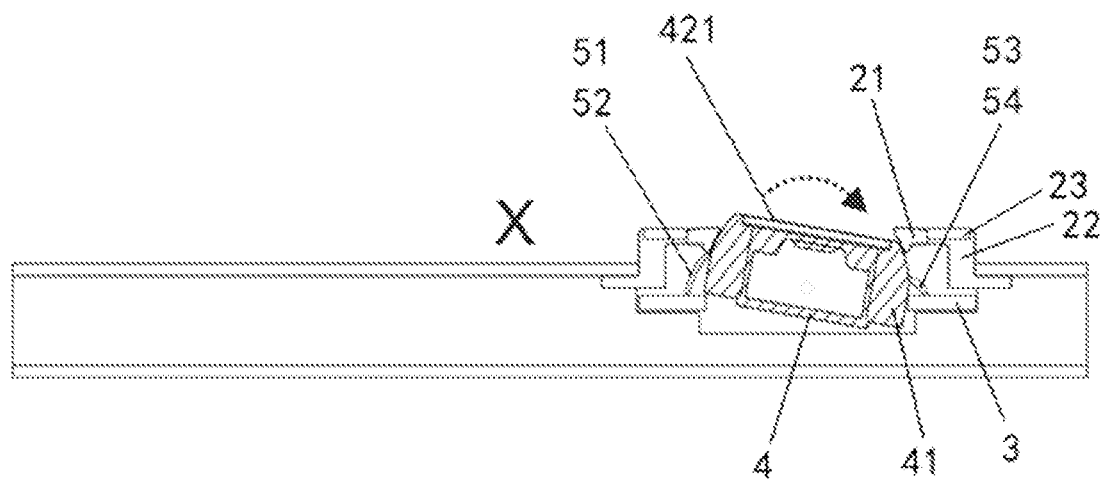
FIG. 9 is a fifth cross-sectional view of a partial structure of an electronic device according to an embodiment of this application.

For example, refer to FIG. 6 to FIG. 8. In a case that the first telescopic member 51 and the second telescopic member 52 are powered on, the first telescopic member 51 and the second telescopic member 52 bend and deform to pull the camera module 4 downwards. At the same time, the third telescopic member 53 and the fourth telescopic member 54 are in an extended state. Similarly, refer to FIG. 9. In a case that the third telescopic member 53 and the fourth telescopic member 54 are powered on, the third telescopic member 53 and the fourth telescopic member 54 bend and deform to pull the camera module 4 downwards. At the same time, the first telescopic member 51 and the second telescopic member 52 are in an extended state.

In any one of the foregoing manners, the drive assembly 5 may drive the camera module 4 to move back and forth (for example, to swing left and right) along a first direction on the plane on which the base 3 is located. The first direction is, for example, an X-axis direction.

Figure 10:
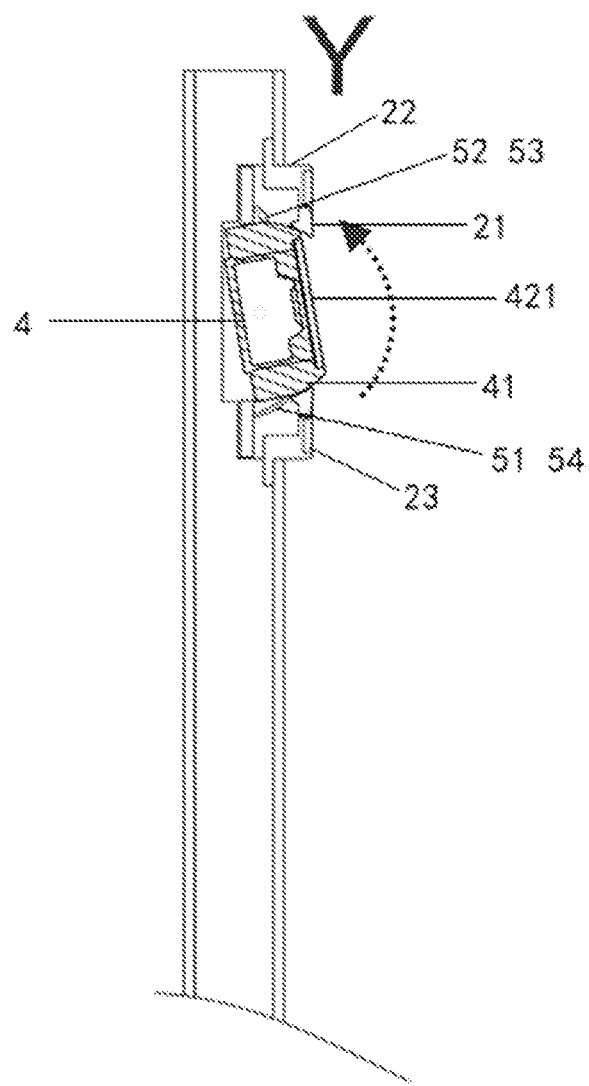
FIG. 10 is a sixth cross-sectional view of a partial structure of an electronic device according to an embodiment of this application.
Figure 11:
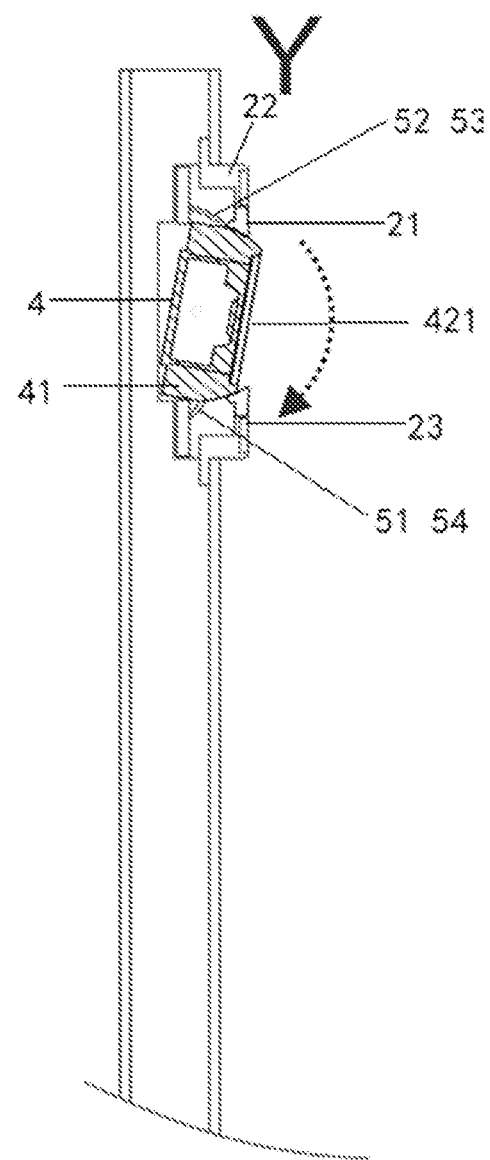
FIG. 11 is a seventh cross-sectional view of a partial structure of an electronic device according to an embodiment of this application.

For example, refer to FIG. 10. In a case that the second telescopic member 52 and the third telescopic member 53 are powered on, the second telescopic member 52 and the third telescopic member 53 bend and deform to pull the camera module 4 downwards. At the same time, the first telescopic member 51 and the fourth telescopic member 54 are in an extended state. Refer to FIG. 11. In a case that the first telescopic member 51 and the fourth telescopic member 54 are powered on, the first telescopic member 51 and the fourth telescopic member 54 bend and deform to pull the camera module 4 downwards. At the same time, the second telescopic member 52 and the third telescopic member 53 are in an extended state. In this way, the drive assembly 5 may drive the camera module 4 to move back and forth along a second direction on the plane on which the base 3 is located. The second direction is, for example, a Y-axis direction.

It should be noted that one of the first direction and the second direction is the X-axis direction in the plane, and the other of the first direction and the second direction is the Y-axis direction.

Figure 12:
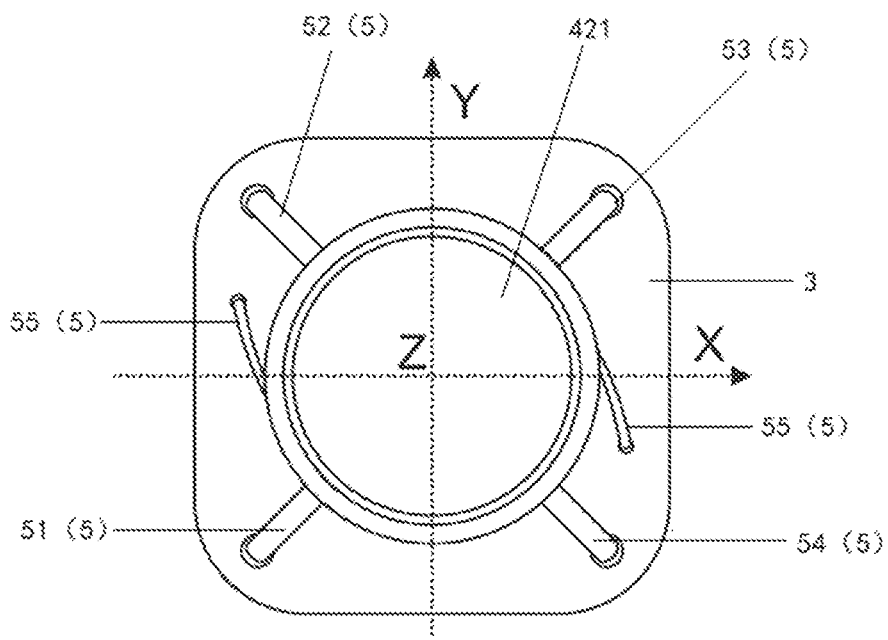
FIG. 12 is a first top view of a pan-tilt camera apparatus of an electronic device according to an embodiment of this application.
Figure 13:
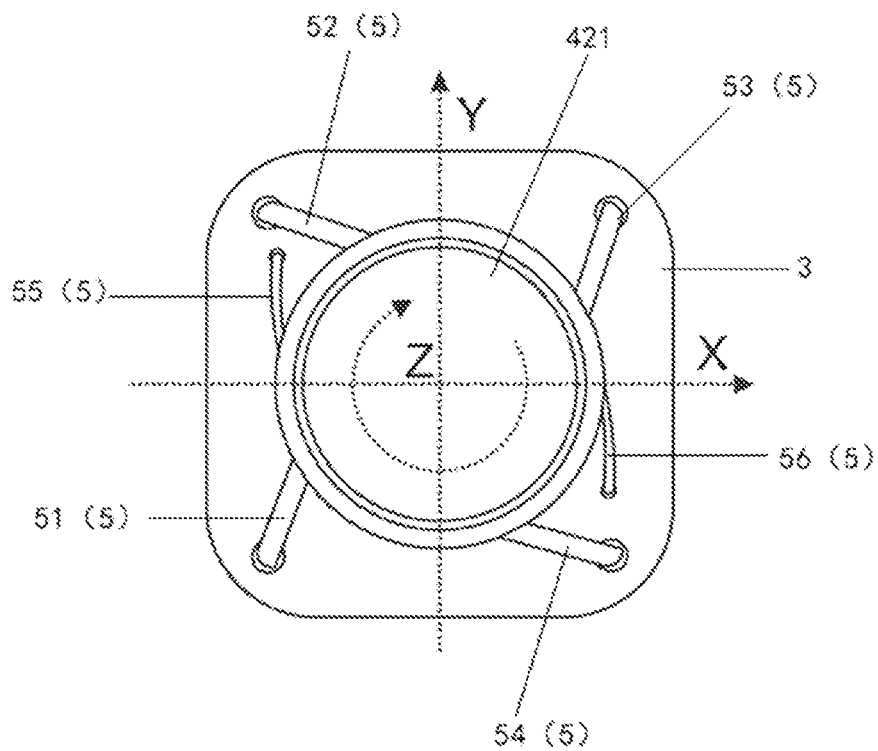
FIG. 13 is a second top view of a pan-tilt camera apparatus of an electronic device according to an embodiment of this application.

In an optional example of this application, refer to FIG. 12 and FIG. 13. The drive assembly 5 includes the first telescopic member 51, the second telescopic member 52, the third telescopic member 53, and the fourth telescopic member 54. In addition, the drive assembly 5 further includes a fifth telescopic member 55 and a sixth telescopic member 56. The fifth telescopic member 55 and the sixth telescopic member 56 are respectively arranged on two sides of the camera module 4 and opposite each other. One of the fifth telescopic member 55 and the sixth telescopic member 56 is able to bend and deform in a case of being powered on, for driving the camera module 4 to rotate on the plane on which the base 3 is located.

The fifth telescopic member 55 and the sixth telescopic member 56 are made of electro-deformable materials.

In an optional example of this application, the fifth telescopic member 55 and the sixth telescopic member 56 are made of ionic polymer metal composite materials. The ionic polymer metal composite material may include a polymer film substrate and metal particles deposited on a surface of the polymer film substrate.

For example, refer to FIG. 13. In a case that the fifth telescopic member 55 is powered on, the fifth telescopic member 55 bend and deform to pull the camera module 4 upwards. At the same time, the sixth telescopic member 56 is in an extended state. In this way, the camera module 4 is driven to rotate.

For example, in a case that the sixth telescopic member 56 is powered on, the sixth telescopic member 56 bend and deform to pull the camera module 4 downwards. At the same time, the fifth telescopic member 55 is in an extended state. In this way, the camera module 4 is driven to rotate.

In other words, the first telescopic member 51, the second telescopic member 52, the third telescopic member 53, and the fourth telescopic member 54 in the drive assembly 5 cooperate with each other to implement translation of the camera module 4 relative to the base 3. The fifth telescopic member 55 or the sixth telescopic member 56 in the drive assembly 5 may be configured to control rotation of the camera module 4 relative to the base 3. Based on this, a shooting angle of the camera module 4 may be adjusted to achieve a purpose of anti-shake.

In an optional example of this application, refer to FIG. 4. An end of each of the first telescopic member 51, the second telescopic member 52, the third telescopic member 53, the fourth telescopic member 54, the fifth telescopic member 55, and the sixth telescopic member 56 is connected to the camera module housing 4. Another end of each of the first telescopic member 51, the second telescopic member 52, the third telescopic member 53, the fourth telescopic member 54, the fifth telescopic member 55, and the sixth telescopic member 56 is connected to the base 3. In other words, the camera module housing 4 is directly connected to the drive assembly 5, and no transmission structure is involved between the camera module housing 4 and the drive assembly 5.

The section of the camera module housing 41 in the radial direction is circular. Therefore, when any one of the fifth telescopic member 55 and the sixth telescopic member 56 is powered on, and bends and deforms to pull the camera module housing 41, the camera module 4 may rotate to adjust the camera module 4 in a Z-axis direction.

It can be learned that the pan-tilt camera apparatus in the embodiments of this application can implement multi-angle anti-shake, and has a good effect of anti-shake.

In an optional example of this application, refer to FIG. 7 to FIG. 11. An accommodating hole is disposed on the base 3, and the camera module 4 is partially accommodated in the accommodating hole. The accommodating hole is configured to allow the camera module to have specific movement space on the base 3.

In an optional example of this application, the electronic device further includes a main board. The drive assembly 5 is electrically connected to the main board.

The main board may be, for example, a hard circuit board or a flexible circuit board, which may be flexibly set by a person skilled in the art based on needs and is not limited in this application.

The main board may supply power to the drive assembly 5, and may further control the drive assembly 5, and then control a movement form of the camera lens 421, to achieve the purpose of anti-shake.

The electronic device in the embodiments of this application may be a terminal or another device other than the terminal. For example, the electronic device may be a mobile phone, a tablet computer, a notebook computer, a palmtop computer, an in-vehicle electronic device, a mobile Internet device (MID), an augmented reality (AR)/virtual reality (VR) device, a robot, a wearable device, an ultra-mobile personal computer (UMPC), a netbook, a personal digital assistant (PDA), or the like. The electronic device may alternatively be a server, a network attached storage (NAS), a personal computer (PC), a television (TV), a teller machine, a self-service machine, or the like. This is not specifically limited in the embodiments of this application.

In the description of this specification, the description with reference to the terms such as "an embodiment", "some embodiments", "an illustrative embodiment", "an example", "a specific example", or "some examples" means that a feature, a structure, a material, or a characteristic described with reference to the embodiment or example is included in at least one embodiment or example of this application. In this specification, illustrative expressions of the foregoing terms do not necessarily refer to the same embodiment or example. Moreover, the feature, structure, material, or characteristic described may be combined in a proper way in any one or more embodiments or examples.

Although the embodiments of this application have been shown and described, a person of ordinary skill in the art can understand that various changes, modifications, replacements, and variants may be made to these embodiments without departing from the principle and purpose of this application, and the scope of this application is limited by the claims and their equivalents.

What is claimed is:

1. An electronic device, comprising:
   a device body, wherein the device body has an inner cavity and an opening communicating with the inner cavity;

a camera module decorative part, wherein the camera module decorative part is disposed in the opening, and the camera module decorative part has a through hole; and a pan-tilt camera apparatus, wherein the pan-tilt camera apparatus is disposed in the inner cavity, the pan-tilt camera apparatus faces toward the through hole, the pan-tilt camera apparatus comprises a base and a camera module, the camera module is movably disposed on the base, and a surface of the camera module facing away from the inner cavity and a surface of the camera module decorative part facing away from the opening are located on a same plane; wherein the pan-tilt camera apparatus further comprises a drive assembly, and the camera module is in transmission connection with the base through the drive assembly; wherein in a case that the drive assembly is powered on, the drive assembly is able to deform and drive the camera module to move relative to the base; wherein the drive assembly comprises: a first telescopic member, a second telescopic member, a third telescopic member, and a fourth telescopic member, wherein the first telescopic member, the second telescopic member, the third telescopic member, and the fourth telescopic member are uniformly distributed around the camera module and disposed opposite each other; and two adjacent telescopic members of the first telescopic member, the second telescopic member, the third telescopic member, and the fourth telescopic member are able to bend and deform in a case of being powered on, for driving the camera module to perform a translation movement on a plane on which the base is located.

2. The electronic device according to claim 1, wherein the camera module decorative part comprises a camera module decorative ring, a camera lens decorative ring and a cover plate that are disposed on the camera module decorative ring; wherein the camera module decorative ring protrudes into the inner cavity through the opening and is connected to the inner cavity; and the cover plate is arranged around an outer edge of the camera lens decorative ring, and the through hole is disposed on the camera lens decorative ring.

3. The electronic device according to claim 2, wherein the camera module comprises a camera module housing and a camera lens assembly disposed in the camera module housing, and the camera lens assembly comprises a camera lens; wherein the camera lens is disposed in the through hole, and a surface of the camera lens and a surface of the camera lens decorative ring are located on a same plane.

4. The electronic device according to claim 3, wherein a section of the camera module housing in a radial direction is circular.

5. The electronic device according to claim 1, wherein the drive assembly comprises: a fifth telescopic member and a sixth telescopic member, and the fifth telescopic member and the sixth telescopic member are respectively arranged on two sides of the camera module and opposite each other; wherein one of the fifth telescopic member and the sixth telescopic member is able to bend and deform in a case of being powered on, for driving the camera module to rotate on the plane on which the base is located.

6. The electronic device according to claim 5, wherein the first telescopic member, the second telescopic member, the third telescopic member, the fourth telescopic member, the fifth telescopic member, and the sixth telescopic member are made of electro-deformable materials.

7. The electronic device according to claim 6, wherein the electro-deformable material is an ionic polymer metal composite material.

8. The electronic device according to claim 1, wherein an accommodating hole is disposed on the base, and the camera module is partially accommodated in the accommodating hole.

9. The electronic device according to claim 1, further comprising a main board, wherein a drive assembly is electrically connected to the main board.

* * * * *